United States Patent [19]

Patsiokas

[11] Patent Number: 5,321,737
[45] Date of Patent: Jun. 14, 1994

[54] CORDLESS TELEPHONE COMMUNICATION SYSTEM HAVING BASE STATIONS WITH MEMORY FOR QUICK ACCESS TO INFORMATION

[75] Inventor: Stelios J. Patsiokas, Plantation, Fla.
[73] Assignee: Motorola, Inc., Schaumburg, Ill.
[21] Appl. No.: 62,324
[22] Filed: May 12, 1993

Related U.S. Application Data

[63] Continuation of Ser. No. 562,978, Aug. 6, 1990, abandoned.

[51] Int. Cl.$^5$ .......................................... H04M 11/08
[52] U.S. Cl. ........................................ 379/58; 379/63; 455/56.1
[58] Field of Search ....................... 379/58, 59, 61, 63, 379/67, 88, 89, 90, 93, 95, 100, 102; 455/33.1, 33.2, 33.4, 53.1, 54.1, 54.2, 56.1; 340/905

[56] References Cited

U.S. PATENT DOCUMENTS

| | | | |
|---|---|---|---|
| 4,558,178 | 12/1985 | Yasuda et al. | 379/63 |
| 4,812,843 | 3/1989 | Champion, III et al. | 340/905 |
| 4,852,148 | 7/1989 | Shibata | 379/61 |
| 4,916,729 | 4/1990 | Usui | 379/63 |
| 4,941,203 | 7/1990 | Patsiokas et al. | 455/53.1 |
| 4,956,876 | 9/1990 | Koshiishi | 379/58 |
| 4,964,156 | 10/1990 | Blair | 379/89 |
| 5,058,201 | 10/1991 | Ishii et al. | 455/33.2 |
| 5,090,049 | 2/1992 | Chen | 379/102 |
| 5,187,810 | 2/1993 | Yoneyama et al. | 340/905 |

FOREIGN PATENT DOCUMENTS

| | | | |
|---|---|---|---|
| 0310318 | 4/1989 | European Pat. Off. | 379/58 |
| 0204640 | 11/1983 | Japan | 379/61 |
| 2216319 | 10/1989 | United Kingdom | 379/61 |

OTHER PUBLICATIONS

Article from The Washington Post, "voiceQuote 976-STOCK", Oct. 9, 1986.
Article from IEICE Technical Report (Japan), "A Case of Member's Management in a Multi-Media Mail System", Morimoto et al., Apr. 1987.
Plantronics advertisement "Cellular Headset", Teleconnect, Mar. 1991, pp. 116-118.

Primary Examiner—Curtis Kuntz
Assistant Examiner—Dwayne D. Bost
Attorney, Agent, or Firm—Michael J. Buchenhorner; M. Mansour Ghomeshi

[57] ABSTRACT

A communication system, for providing services to a plurality of subscribers, comprises a network controller, a base station, and a wireless mobile subscriber unit. The network controller includes a memory for storing a plurality of memory templates. Each memory template contains information pertaining to a subscriber. A controller processes information in the memory templates. A transceiver transmits information from the memory templates to subscribers upon request by a subscriber and at times automatically determined by the network controller. A general services tank provides general services to the subscribers, and an individual services tank provides individual services to the subscribers. The base stations each include a radio transceiver that includes a memory, coupled to the radio transceiver, for storing a plurality of memory templates. The base stations also include a controller, coupled to the memory, for processing information in the memory templates and a transceiver for receiving the requests for processing of the information contained in the memory templates stored in the memory of the base station. Lastly, the wireless mobile subscriber units each contain a radio transceiver, apparatus, coupled to the radio transceiver for requesting access to information from the memory templates in the network controller, and alternatively from the base station. The wireless mobile subscriber units also contain apparatus for requesting processing of the information contained in the memory templates.

3 Claims, 4 Drawing Sheets

CORDLESS TELEPHONE COMMUNICATION SYSTEM HAVING BASE STATIONS WITH MEMORY FOR QUICK ACCESS TO INFORMATION

This is a continuation of application Ser. No. 07/562,978, filed on Aug. 6, 1990 and now abandoned.

TECHNICAL FIELD

This invention relates generally to cordless telephone systems.

BACKGROUND

Present cordless telephone systems operate with private base stations at user's homes, offices or other locations which are connected to a public telephone system. Each base station is typically meant to be used by one subscriber. In the next generation of cordless telephones (called CT-2, for cordless telephone-2) there will be a plurality of public base stations (also called telepoints) that may be used by any subscribers within range. In the future such public base stations may become as common as public telephones are today. When in range, a subscriber will be able to access the public switched telephone network (PSTN) and place a call.

SUMMARY OF THE INVENTION

Briefly, according to the invention, a communication system, for providing services to a plurality of subscribers, comprises a network controller a base station, and a wireless mobile subscriber unit. The network controller, comprises a memory for storing a plurality of information sets pertaining to a plurality of subscribers, input means, coupled to the memory, for storing the information sets in the memory, output means for retrieving the information sets from the memory, and controller means for processing information in the information sets stored in the memory. The base station, which is coupled to the network controller, comprises a radio transceiver, and a memory for storing a plurality of information sets, input means, coupled to the memory, for storing the information sets in the memory, output means for retrieving the information sets from the memory, and controller means for processing information in the information sets stored in the memory. The wireless mobile subscriber unit comprises a radio transceiver and request means for requesting information from the information sets in the network controller, and alternatively from the base station.

DETAILED DESCRIPTION OF THE PREFERRED EMBODIMENT

Figure 1:
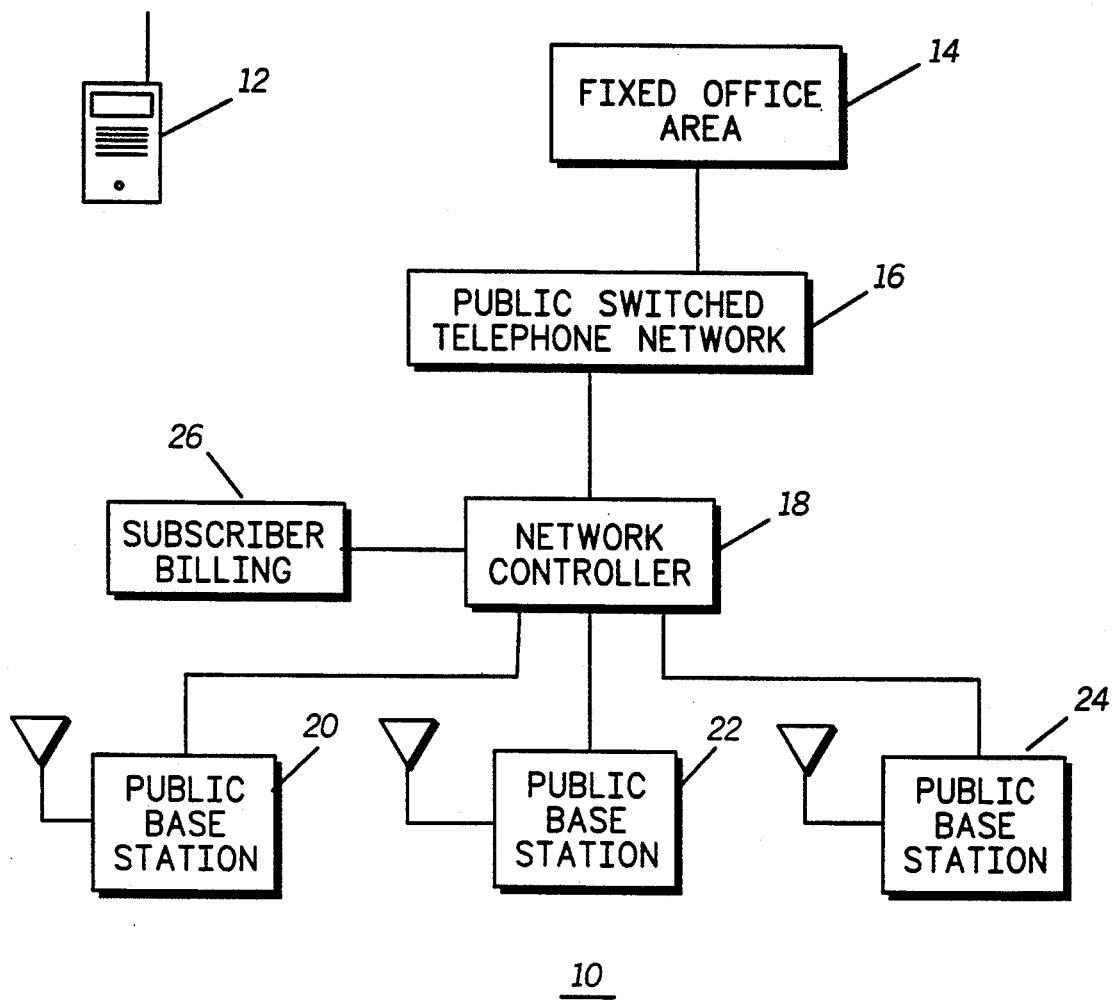
FIG. 1 conceptually shows a wireless phonebooth network in accordance with the invention.

Referring to FIG. 1, a communication system 10, for providing services to a plurality of subscribers (not shown), comprises a network controller 18 a plurality of base stations (represented by public bases 20, 22, and 24), and a plurality of wireless mobile subscriber units (represented by handset 12). The network controller 18 is also connected to a public switched telephone network 16 to allow subscribers to communicate with wired telephone users. The invention allows a subscriber leaving a fixed office area 14 to be able to perform most if not all of the functions that he or she could perform in the fixed office area 14 by means of the wireless mobile subscriber unit 12. Each subscriber will be able to communicate with a network controller 18 via a network of public base stations (e.g., public base stations 20, 22, and 24).

The network controller 18 provides the subscribers a variety of services falling generally into two categories: general and individual services. General services are defined to mean services that are available to all subscribers and include thesaurus/dictionary services, translation and time services, a calendar, stock market results, and sports scores. Individual services are defined to mean personalized services such as an individual telephone directly, a monthly/weekly/daily schedule, important personal dates (e.g., wife's birthday), an automatic reminder feature, a memo pad, or individual tax services.

Figure 2:
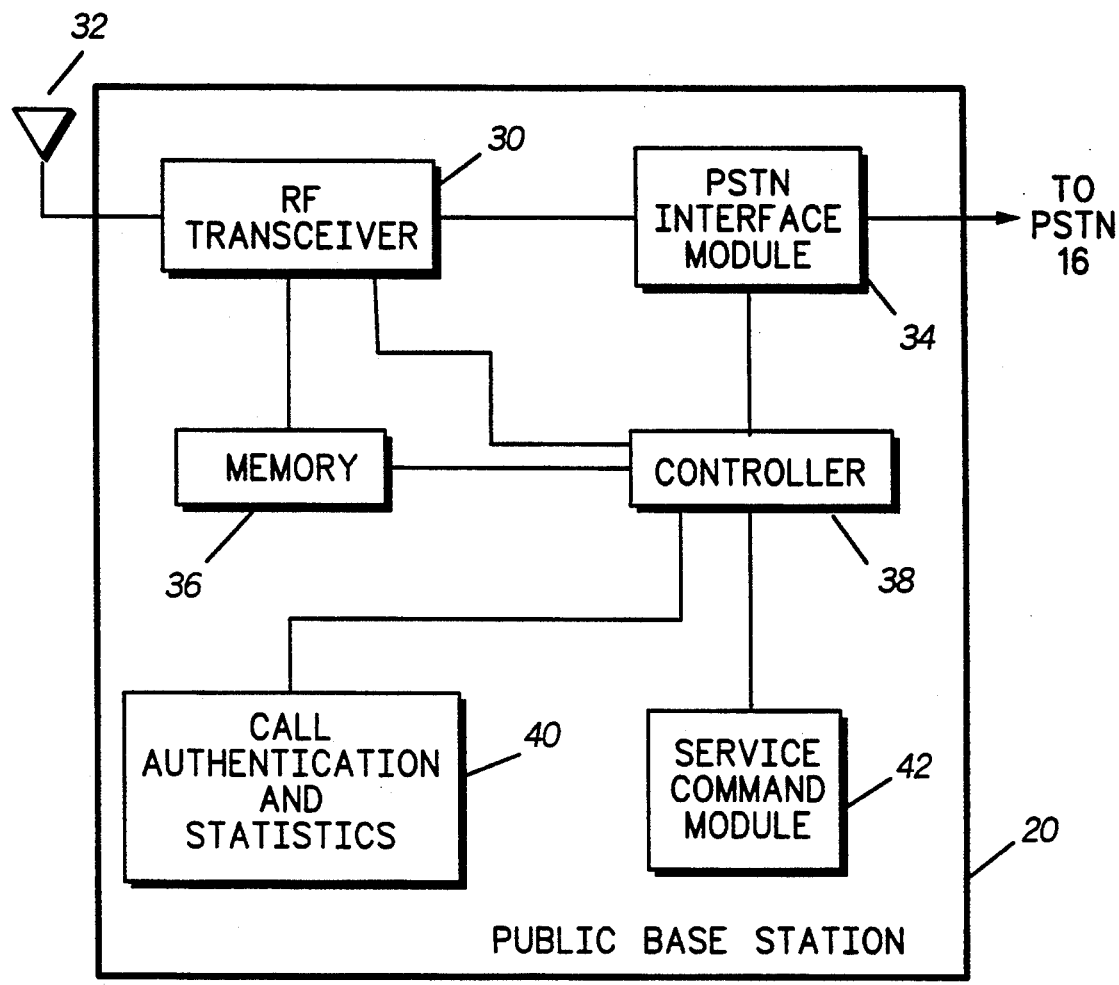
FIG. 2 shows a basic block diagram of a public wireless phone booth in accordance with the invention.

Referring to FIG. 2, a public base station (or wireless phonebooth) 20, in accordance with the invention, is shown in block diagram form. Each of the components of the wireless phonebooth 20 represented by a block is conventional. The base station 20, which is coupled to the network controller 18, comprises a radio transceiver 30, and a memory 36 for storing information including memory templates containing information relating to subscribers, and a controller 38 (e.g., a conventional microprocessor) for processing the information stored in the memory 36. The controller 38 may also include digital signal processing (DSP) capabilities for turning voice signals into digital form and processing those signals using well-known DSP methods. A module 40 provides call authentication and statistic functions for the base station 20, and a service command module processes requests for services and informs the network controller 18 what services are required. A PSTN interface module 34 provides an interface with the public services telephone network 16.

The base station 20 enables a subscriber to acquire access to any of the information and services available through the network controller 18. Moreover, since the base station 20 has its own memory, the memory templates relating to a subscriber may be transferred to it, thus allowing the base station 20 to provide the requested services and/or information to the requesting subscriber without a continuous coupling to the network controller 18.

Figure 3:
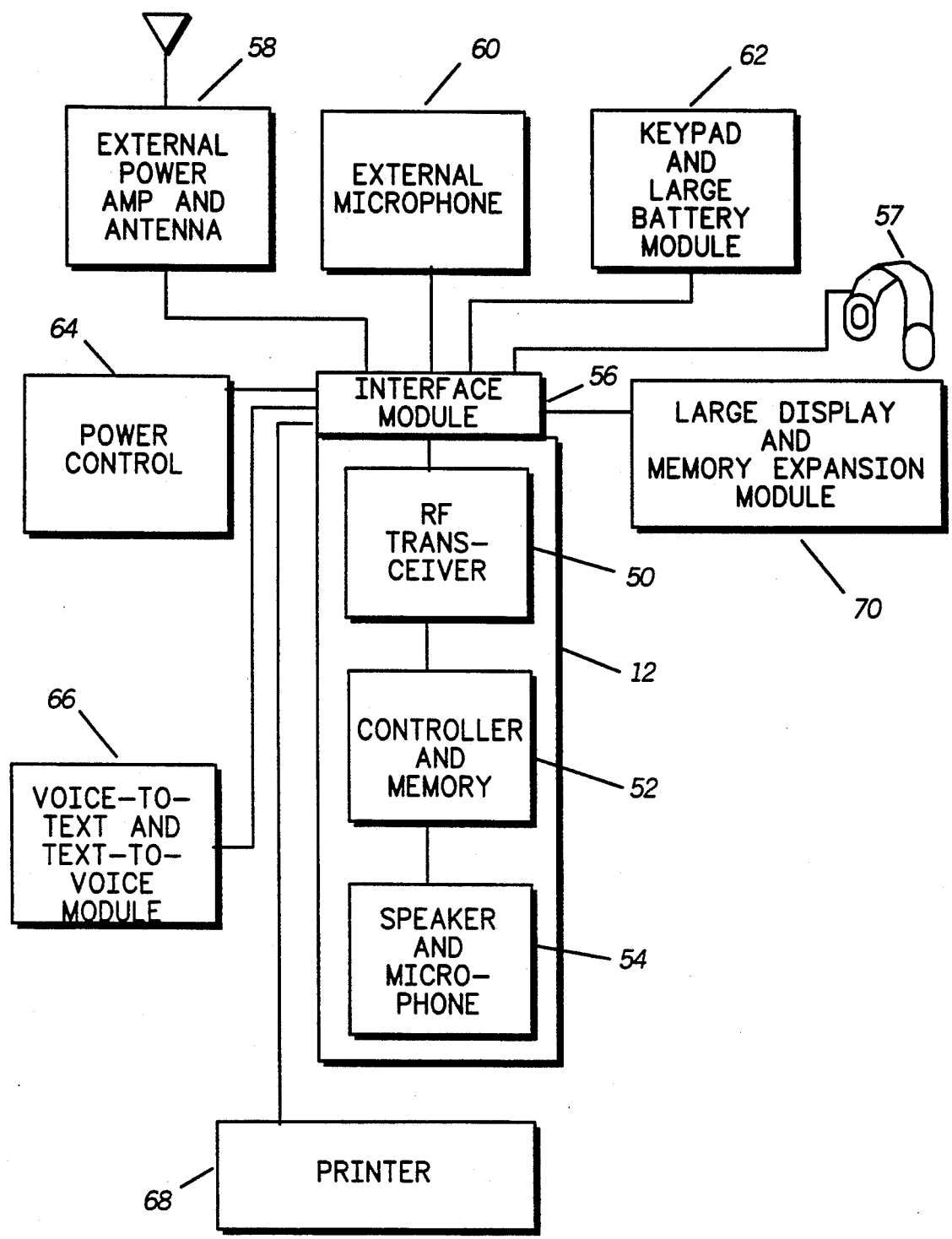
FIG. 3 shows a block diagram of a standard portable office in accordance with the invention.

Referring to FIG. 3, a standard portable office using a cordless telephone handset 12, in accordance with the invention is shown. The cordless telephone handset (or wireless mobile subscriber unit) 12 comprises a conventional radio transceiver 50 which may operate as a means for requesting information from the memory in the network controller 18 (or, and alternatively in the base station 20). The cordless telephone handset further comprises a controller and memory module 52, and a speaker/microphone 54. The controller and memory module 52 allow the subscriber to load information received from a base station into the memory 52 and process it. The processed information then may be sent to the base station 20 or network controller 18. A connector 56 includes ports for coupling to a plurality of accessory modules that allow the cordless telephone handset 12 to operate as a portable office. Thus, an external power amplifier and antenna 58 may be connected to the cordless telephone handset 12 to extend the range of the portable office. An external microphone 60 may also be connected to cordless telephone handset 12 to free the user from holding the cordless telephone handset 12 while performing other operations. A keypad and large battery module 62 allows the user to type commands or information to the fixed office 14. A power control module 64 may be connected to the cordless telephone handset 12 to enhance its power control capabilities. A voice-to-text and text-to-voice module 68 would allow the user to dictate documents into the cordless telephone handset 12 and reteive an oral version of a transmitted document. A printer 68 would provide the user with printed documents (which are possibly generated in the fixed office or received from another subscriber). A large display and memory expansion module 70 provides the user with an easier to read display (possibly an LCD display) and a greater memory. A headphone 57 may also be coupled to the handset 12.

Figure 4:
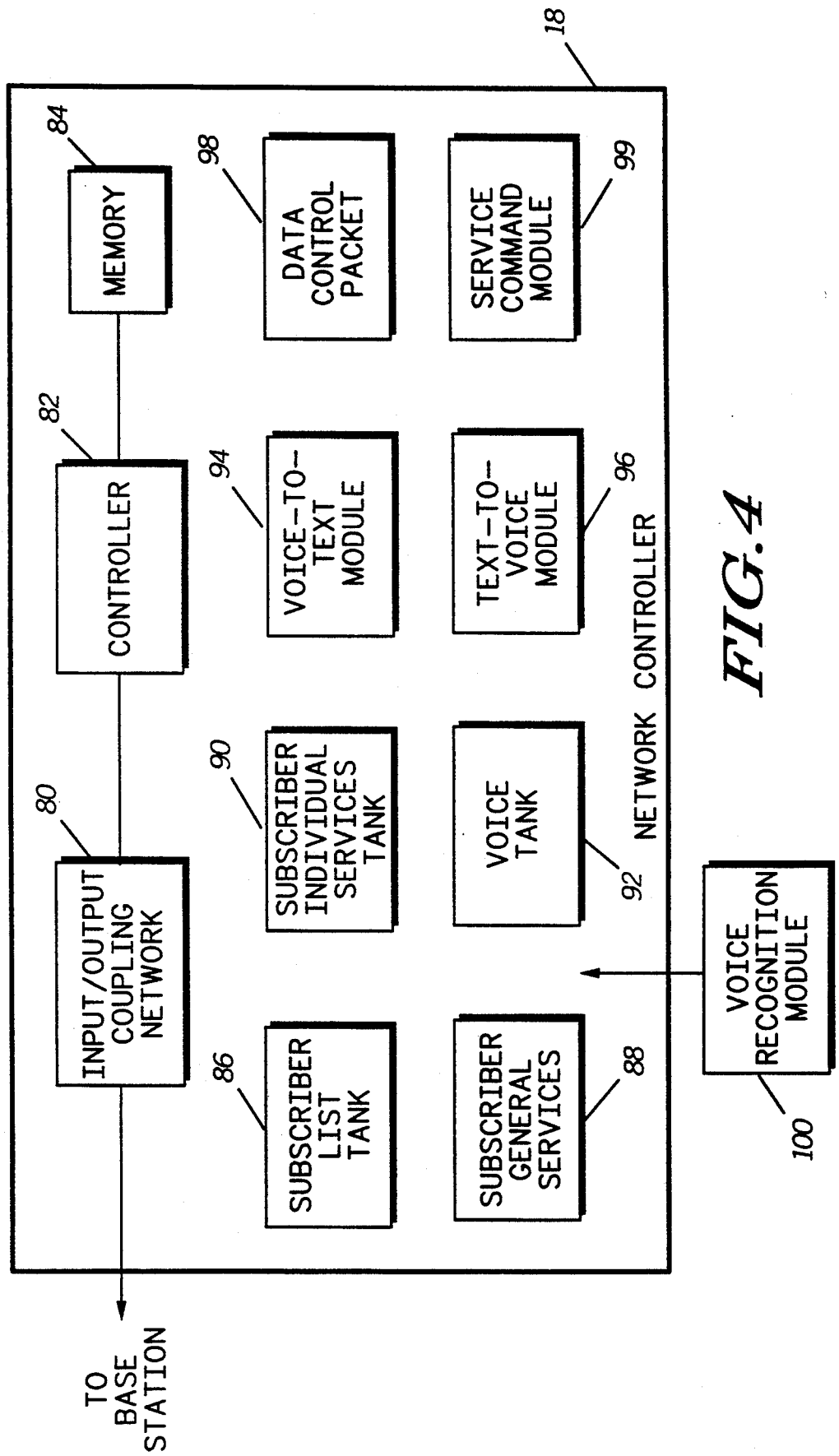
FIG. 4 shows a block diagram of a standard network controller in accordance with the invention.

Referring to FIG. 4, the network controller 18, comprises an input/output coupling network 80 to couple to the base stations, a controller 82 for processing the information received and transmitted, and a memory 84 for storing information pertaining to a plurality of subscribers. A plurality of modules may be coupled to the controller 82 to enhance the range of services that may be provided to subscribers. Thus, a subscriber list tank 86 contains a current listing of subscribers. A subscriber general services module 88 contains conventional hardware and software for providing general services. Similarly, a subscriber individual services module 90 contains conventional hardware and software for providing individual or personal services. A voice tank 92 allows the user to receive voice messages, store them, and listen to them at a later time. A voice-to-text module 94 and a text-to-voice module 96 also allow the user to dictate documents into the cordless telephone handset 12 and retrieve an oral version of a transmitted document. A data control packet 98 controls the interchange of data based on the availability of lines connecting the network controller 18 to the PSTN 16 or to the base stations. A service command module 99 informs the base stations what services are required and processes service requests. The network controller 18 also includes a conventional voice recognition module.

Therefore, the invention provides means by which a subscriber to a public cordless telephone network may convert his or her handset into a portable office.

What is claimed is:

1. A communication system, for providing services to a plurality of subscribers, comprising:
   a wireless mobile subscriber unit;
   a network controller for providing the wireless mobile subscriber unit with general and individual services;
   a plurality of base stations for providing information to the mobile subscriber unit without actively having to retrieve the information from the network controller, the plurality of base stations, comprising:
   a radio transceiver;
   a memory, coupled to the radio transceiver, for storing a plurality of memory templates in order to rapidly respond to information requests without continuously referring to the network controller, each memory template containing data information;
   controller means, coupled to the memory, for processing the data information in the memory templates; and
   the receiver portion of the radio transceiver receives requests from the wireless mobile subscriber unit for processing of the data information contained in the memory templates; and
   transmitter portion of the transmitter transmits the information of the memory templates to the wireless mobile subscriber unit.

2. The communication system of claim 1, wherein the wireless mobile subscriber unit further comprises means for requesting processing of the information contained in the information sets stored in the memory of the base station.

3. The communication system of claim 1, wherein the network controller further comprises a service command module coupled to the means for interfacing with a public service telephone network.

* * * * *